US011723379B2

(12) United States Patent
Draper et al.

(10) Patent No.: US 11,723,379 B2
(45) Date of Patent: Aug. 15, 2023

(54) YOGURT SNACK

(71) Applicant: DSM IP ASSETS B.V., Heerlen (NL)

(72) Inventors: Regina Marie Draper, Waukesha, WI (US); Kayla Marie Polzin, Waukesha, WI (US); David Jay Williams, Waukesha, WI (US)

(73) Assignee: DSM IP ASSETS B.V., TE Heerlen (NL)

( * ) Notice: Subject to any disclaimer, the term of this patent is extended or adjusted under 35 U.S.C. 154(b) by 0 days.

(21) Appl. No.: 17/050,305

(22) PCT Filed: Apr. 18, 2019

(86) PCT No.: PCT/EP2019/060068
§ 371 (c)(1),
(2) Date: Oct. 23, 2020

(87) PCT Pub. No.: WO2019/206797
PCT Pub. Date: Oct. 31, 2019

(65) Prior Publication Data
US 2021/0112820 A1    Apr. 22, 2021

Related U.S. Application Data

(60) Provisional application No. 62/662,975, filed on Apr. 26, 2018.

(30) Foreign Application Priority Data

May 8, 2018    (EP) ..................................... 18171248

(51) Int. Cl.
A23C 9/13    (2006.01)

(52) U.S. Cl.
CPC .......... *A23C 9/13* (2013.01); *A23C 2220/208* (2013.01); *A23C 2260/05* (2013.01)

(58) Field of Classification Search
CPC .. A23C 9/13; A23C 2220/208; A23C 2260/05
(Continued)

(56) References Cited

U.S. PATENT DOCUMENTS 5,518,740 A    5/1996   Costanzo et al.
6,187,365 B1   2/2001   Vaghela et al.
(Continued)

FOREIGN PATENT DOCUMENTS

CN    106061274      10/2016
EP    3 245 874 A1   11/2017
(Continued)

OTHER PUBLICATIONS

PCT International Search Report for PCT/EP2019/060068, dated Jul. 11, 2019.
(Continued)

*Primary Examiner* — Brent T O'Hern
(74) *Attorney, Agent, or Firm* — McBee Moore & Vanik IP, LLC

(57) ABSTRACT

The present invention describes a method for producing a set-type yogurt snack, said method comprising allowing said yogurt snack to set in a mold or block and wherein said yogurt snack comprises at least 12% (w/w) protein and at least 35% (w/w) total solids.

19 Claims, 5 Drawing Sheets

(58) Field of Classification Search
USPC .......................................................... 426/42
See application file for complete search history.

(56) References Cited

U.S. PATENT DOCUMENTS

2015/0250197 A1    9/2015  Konchakovskiy
2016/0309731 A1*  10/2016  Catonnet ............... A23L 29/212
2017/0367358 A1   12/2017  Rakosi

FOREIGN PATENT DOCUMENTS

WO    2014/095543 A1    6/2014
WO    2015/092044 A1    6/2015
WO    2017/109532 A1    6/2017

OTHER PUBLICATIONS

Anonymous: "Clio Greek Yogurt Bars," Jun. 27, 2017, XP055600763, Retrieved from the Internet: URL:https://strongoverskinni.wordpress.com /2017/06/27/clio-greek-yogurt-bars/.
"Optimization of Fermented Milk Curd Processing Technology" Journal of Dairy Science and Technology (2009) 3:133-137.

* cited by examiner

YOGURT SNACK

CROSS-REFERENCE TO RELATED APPLICATIONS

This application is the National Stage entry of International Application No. PCT/EP2019/060068, filed 18 Apr. 2019, which claims priority to U.S. No. 62/662,975, filed 26 Apr. 2018, and European Patent Application 18171248.0, filed 8 May 2018.

BACKGROUND

Field

The present invention relates to the field of food. More specifically, this invention relates to a method for producing a dairy based snack bar. The invention further relates to a dairy based snack bar.

Description of Related Art

In U.S. Pat. No. 6,187,365 it is described how to prepare frozen yogurt containing live cultures, having a consistency similar to ice cream, into a bar form, and coating the frozen bar with chocolate. These frozen articles must be maintained in a frozen state, otherwise a lack of core structure will result in the loss of the formed shape, were the yogurt allowed to melt. Thus these frozen yogurt bars are not conveniently portable, as they must be reliably maintained at a temperature that is below freezing.

U.S. Pat. No. 55,187,400 describes a freeze-dried yoghurt bar wherein the removal of the water from the yogurt composition results in a stable, solid body, subjected to an icing step by coating, for example, with chocolate, sugars, wax. A freeze-dried yogurt would possess an altered texture, due to the lack of moisture present in the processed yogurt.

US2015/0250197 describes a dairy based snack product as having a similar shape and appearance as a conventional candy bar, where the inner core is replaced with a dairy based filling mixture composed of a yogurt component and/or a dairy based product, described as a soft cheese, and coated with an edible shell, such as chocolate. This disclosure states that Greek yogurt is unsuitable for a small size portable snack food, and therefore is offered in a cup to be eaten with a spoon, or alternatively, provided in a tube for consumption without utensils, or be mixed with hydrocolloid gum ingredients to achieve a gelled-type dairy mixture, albeit with an unnatural, and possibly unhealthy ingredient added. To form the bar shape, the dairy mixture is fed into a hopper of a molding/forming/cutting machine which forms and cuts the bars, by extrusion of the dairy mix through a die, and cutting to desired length.

It is the intent of this invention to overcome these and other shortcomings of the prior art. What is beneficially provided by the practice of the methods, and products described herein is a set-type yogurt snack, that maintains the microstructure of the set yogurt necessary to retain the liquid whey component immobilized within the yogurt body, and not subject to having been disturbed by having its microstructure disrupted, as would occur if combined with additional ingredients or texture modifiers incorporated after the yogurt has been set. The resulting yogurt body contemplated herein possesses a solids content that provides the required mechanical strength necessary to allow the yogurt to be self-supporting, such that it can be manipulated for application of coating, and distributed, all while in a thawed state. Such a bar provides a healthy, readily portable snack.

The aim of the present invention is to produce a dairy snack that can be labelled as a yogurt snack.

SUMMARY OF THE INVENTION

The invention provides a method for producing a set-type (or set-style, the terms are used interchangeably herein) yogurt snack, said method comprising allowing said yogurt snack to set in a mold or block and wherein said yogurt snack comprises at least 12% (w/w) protein and at least 35% (w/w) total solids.

The invention further provides a set-type of yogurt snack, comprising at least 12% (w/w) protein and at least 35% (w/w) total solids.

DETAILED DESCRIPTION OF A PREFERRED EMBODIMENT

Figure 1A:
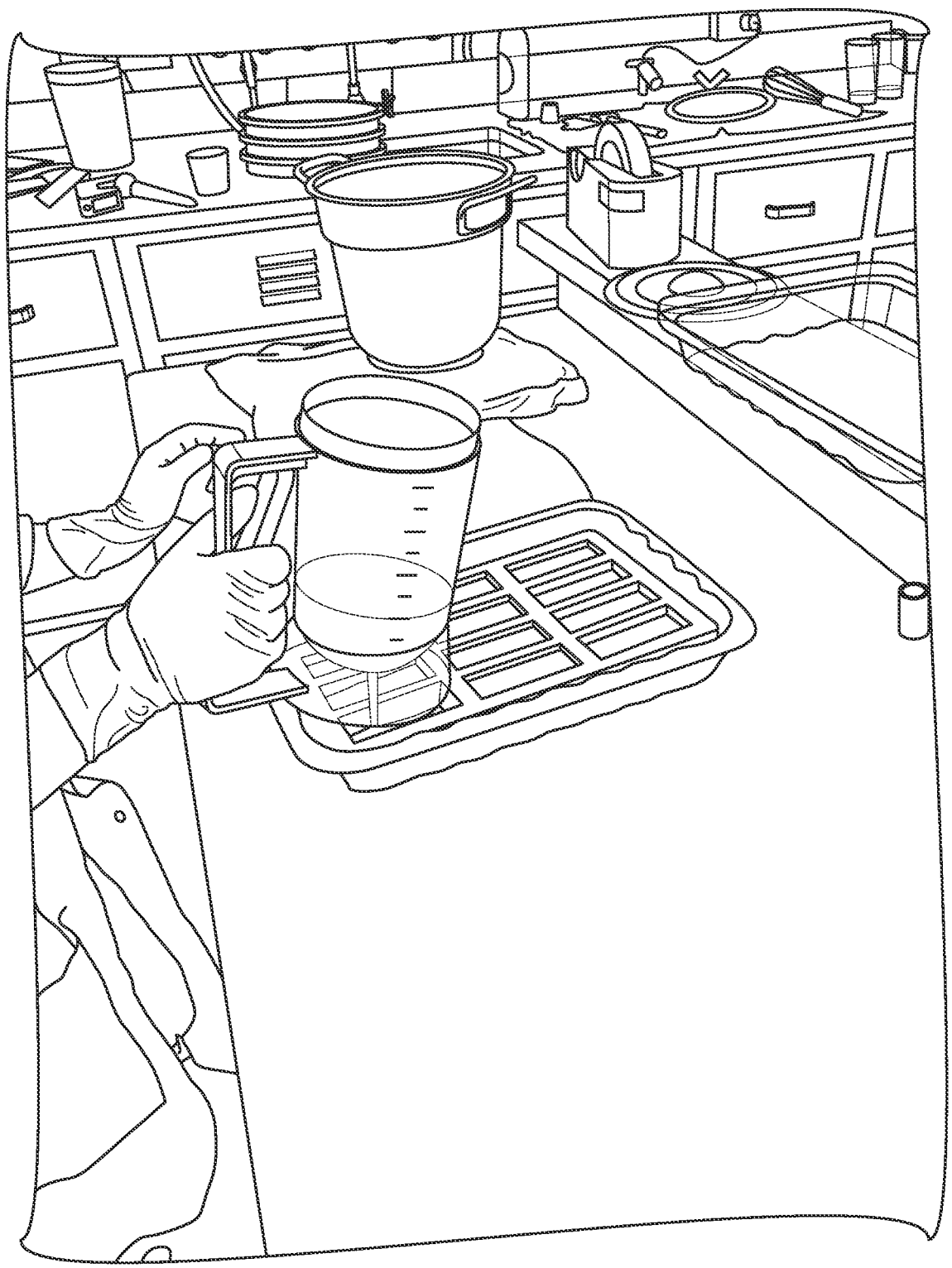
FIGS. 1A-E show examples of a snack according to the invention in the shape of a bar.
Figure 1B:
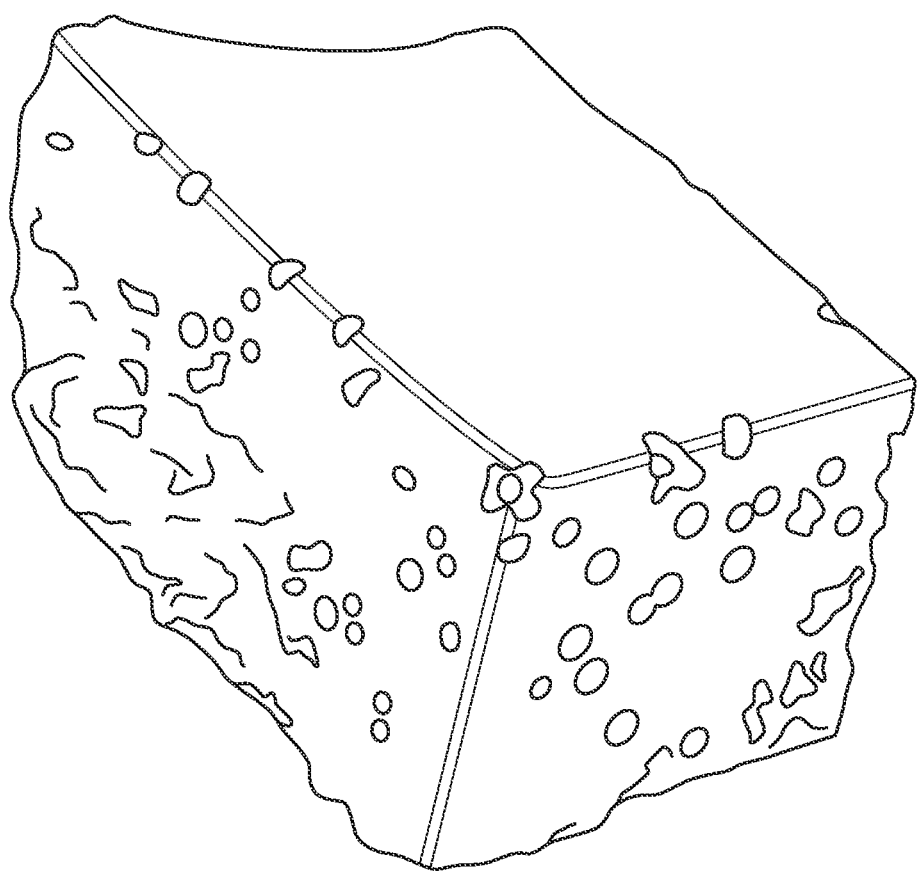
Figure 1C:
Figure 1D:
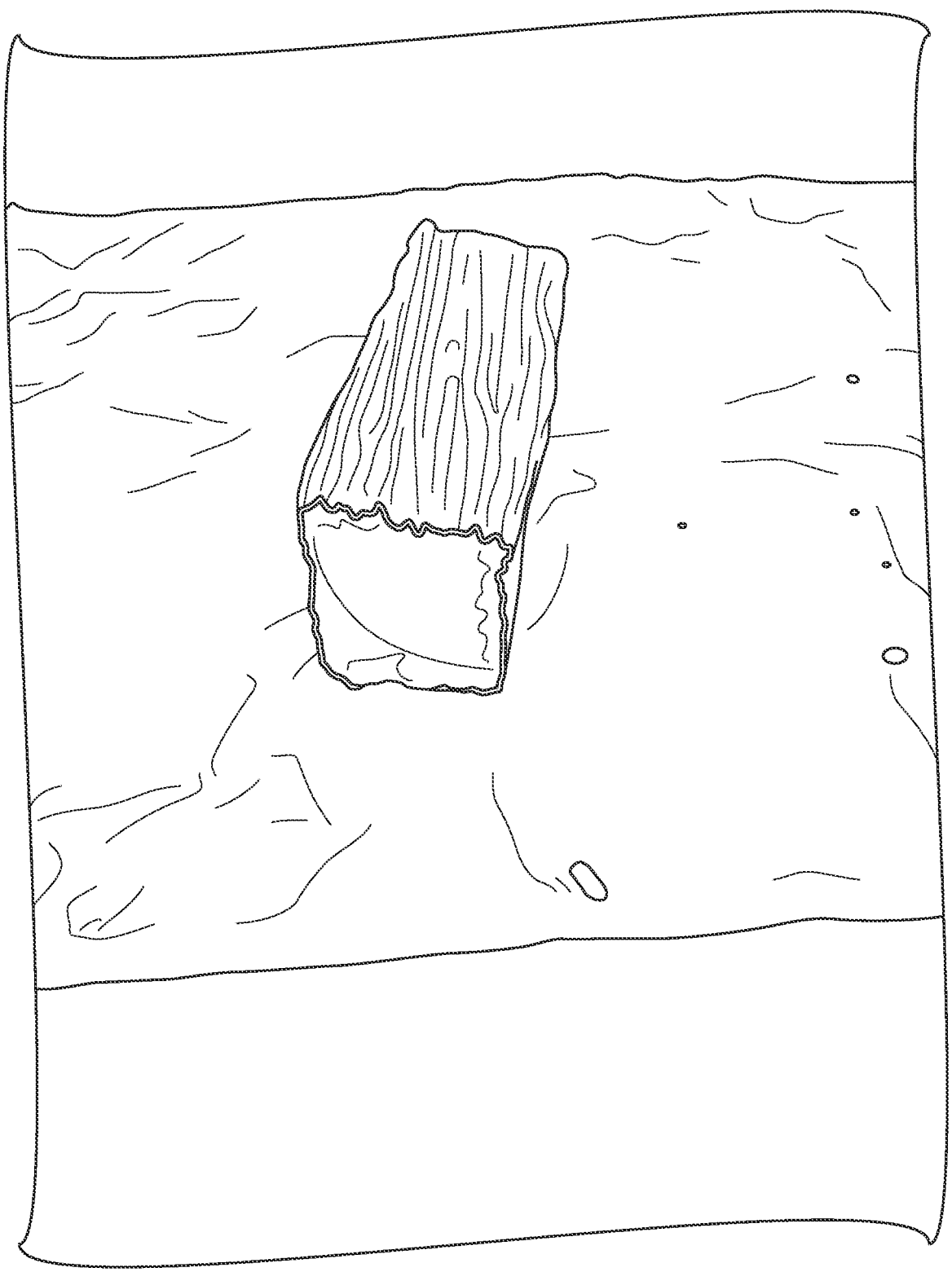
Figure 1E:
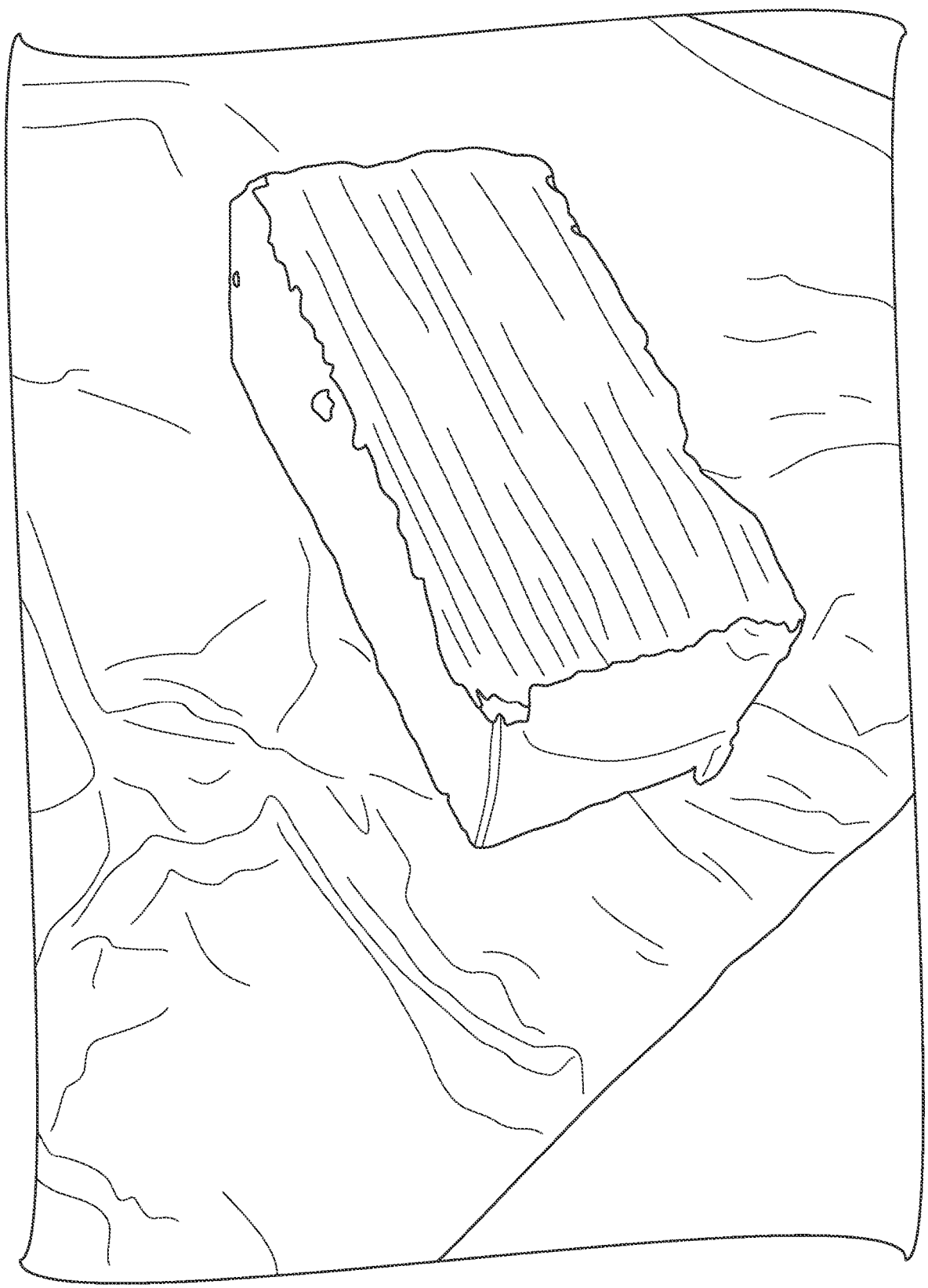

The present invention relates to a method for producing a set-type yogurt snack, said method comprising allowing said yogurt snack to set in a mold or block and wherein said yogurt snack comprises at least 12% (w/w) protein and at least 35% (w/w) total solids. As will be explained in more detail below, the term "to set in a mold or block" refers to acidification (also referred to as fermentation or culturing with lactic acid bacteria) taking place in a mold or block and hence, the present invention relates to a method for producing a set-type yogurt snack, said method comprising allowing said yogurt snack to acidify in a mold or block and wherein said yogurt snack comprises at least 12% (w/w) protein and at least 35% (w/w) total solids. Preferably, the invention provides a method for producing a set-type yogurt snack, said method comprising allowing said yogurt snack to acidify in a mold or block and wherein said yogurt snack comprises at least 12% (w/w) protein and at least 35% (w/w) total solids and wherein said method further comprises the removal of the resulting set-type yogurt snack from said mold or block. Alternatively phrased, the present invention provides a method for producing a set-type yogurt snack which comprises at least 12% (w/w) protein and at least 35% (w/w) total solids, said method comprising allowing said yogurt snack to acidify in a mold or block and wherein said method further comprises the removal of the resulting set-type yogurt snack from said mold or block. As will be explained below, the set-type yogurt snack can comprise additional non-yogurt components. In the context of the present invention, the mentioned weight percentages of protein and total solids relate to the yogurt part of the yogurt snack. E.g. the yogurt snack may be at least partly covered with a layer of chocolate but the protein and solids of such a chocolate layer are not part of the claimed weight percentage protein and weight percentage total solids. The present invention thus relates to a method for producing a set-type yogurt snack, said method comprising allowing said yogurt snack to set (acidify) in a mold or block and wherein the yogurt part of said yogurt snack comprises at least 12% (w/w) protein and at least 35% (w/w) total solids and wherein said method further comprises the removal of the resulting set-type yogurt snack from said mold or block.

As used in the present specification, the term "yogurt" (or "yoghurt", the terms are used interchangeably herein) refers to products comprising lactic acid bacteria such as *Streptococcus salivarius thermophilus* and *Lactobacillus delbruekii* subsp. *bulgaricus*, but also, optionally, other microorganisms such as *Lactobacillus delbruekii* subsp. *lactis*, *Bifidobacterium animalis* subsp. *lactis*, *Lactococcus lactis*, *Lactobacillus acidophilus* and *Lactobacillus casei*, or any microorganism derived therefrom. The lactic acid strains other than *Streptococcus salivarius thermophilus* and *Lactobacillus delbruekii* subsp. *bulgaricus*, are intended to give the finished product various properties, such as the property of promoting the equilibrium of the gut microbiota.

The term "yogurt" encompasses, but is not limited to, yoghurt as defined according to French and European regulations, e.g. coagulated dairy products obtained by lactic acid fermentation by means of specific thermophilic lactic acid bacteria only (i.e. *Lactobacillus delbruekii* subsp. *bulgaricus* and *Streptococcus salivarius thermophilus*) which are cultured simultaneously and are found to be live in the final product in an amount of at least 10 million CFU (colony-forming unit)/g. Preferably, the yogurt is not heat-treated after fermentation. Such yogurt advantageously meets the specifications for fermented milks and yogurts of the AFNOR NF 04-600 standard and/or the codex StanA-IIa-1975 standard. In order to satisfy the AFNOR NF 04-600 standard, the product must not have been heated after fermentation and the dairy raw materials must represent a minimum of 70% (m/m) of the finished product.

A method of the invention does not include a step of curd solidification in general or curd solidification by heating in specific. Alternatively phrased, the set-style yogurt snack is not a (fresh) yogurt cheese.

The present invention relates to a set-type yogurt snack, i.e. the used inoculated milk substrate is—in contrast to stirred yogurt—allowed to acidify without any further (post) stirring or mixing. In the present invention, the yogurt is allowed to set (or alternatively phrased allowed to acidify, to ferment or to culture in the presence of lactic acid bacteria) in a mold or block. I.e. a method according to the invention comprises inoculating a(n) (unfermented) milk-based starting material with lactic acid bacteria and pouring the obtained inoculated milk-based starting material in a mold or block and allow the yogurt to acidify (alternatively phrased to ferment or to culture or to set) in the mold or block.

A method of the invention comprises a step of removal of the resulting set-type yogurt snack from said mold or block. The resulting set-type yogurt snack is removed as one piece (i.e. as a whole) from the mold or block.

Any method as described herein uses a container in which yogurt can ferment/acidify/set in a food grade setting. Examples of a suitable container are a mold or block. The used mold or block can be made of any suitable material. The material must be such that it can withstand the temperature used for acidification, such as in the range of 35 to 45° C. Preferably, the material of the mold or block is also able to withstand temperatures such as 4 to 12° C. such that the used mold or block can be put into a cooler to allow cooling of the set-type yogurt snack (after the desired degree of acidification/end of fermentation is reached). As used herein, a mold or block is a container or casing in which the yogurt is allowed to acidify (alternatively ferment, culture or set). The mold or block is a temporary container or casing and is only used to provide the set-style yogurt snack with its desired shape and hence the set-style yogurt is removed from the mold or block after the set-style yogurt has been formed.

The determination of total solids is preferably performed as described in ISO 6731:2010 (IDF 21:2010) Milk, cream and evaporated milk—Determination of total solids content (Reference method).

The determination of the protein content is preferably performed as described in ISO 8968-1:2014 Milk and milk products—Determination of nitrogen content—Part 1: Kjeldahl principle and crude protein calculation and ISO 8968-4:2016 Milk and milk products—Determination of nitrogen content—Part 4: Determination of protein and non-protein nitrogen content and true protein content calculation (Reference method).

In a preferred embodiment, the invention provides a method for producing a set-type yogurt snack, said method comprising allowing said yogurt snack to acidify in a mold or block and wherein said yogurt snack comprises at least 12% (w/w) protein and at least 35% (w/w) total solids and wherein said method further comprises the removal of the resulting set-type yogurt snack from said mold or block and wherein said set-style yogurt snack does not comprise a hydrocolloid, a gelling agent, a thickening agent or a stabilizer.

Alternatively phrased, the present invention provides a method for producing a set-type yogurt snack which comprises at least 12% (w/w) protein and at least 35% (w/w) total solids and wherein said set-style yogurt snack does not comprise a hydrocolloid, a gelling agent, a thickening agent or a stabilizer, said method comprising allowing said yogurt snack to acidify in a mold or block and wherein said method further comprises the removal of the resulting set-type yogurt snack from said mold or block.

A method of the invention thus results in a clean label set-type yogurt snack.

In a preferred embodiment, a method of the invention does not comprise a step of mixing the obtained set-style yoghurt with other ingredients, such as but not limited to mixing of the set-style yogurt with another dairy based product (such as but not limited to cheese).

Preferably, a method of the invention does also not comprise a step of
    freezing and thawing or
    of dehydrating the set-style yogurt, or
    freeze drying.

As will be explained in more detail later, the set-type yogurt snack of the present invention can have any shape. The snack can also have any size, but preferably the set-type yogurt snack is a hand-held set-type yogurt snack, i.e. it can for example have the size of a regular snack bar or the size of a sandwich or the size of a piece of cake. The invention thus provides a method for producing a set-type yogurt snack, said method comprising allowing said yogurt snack to acidify in a mold or block and wherein said yogurt snack comprises at least 12% (w/w) protein and at least 35% (w/w) total solids, wherein said yogurt snack is a hand-held set-type yogurt snack, and wherein said method further comprises the removal of the resulting set-type yogurt snack from said mold or block.

The yogurt snack of the invention comprises at least 12% (w/w) protein. The inventors of the present invention have noticed that even higher protein percentages result in a yogurt snack with a more desired texture, such as softer, creamier, less grainy but still holding its shape (even at room temperature). Hence, the invention thus provides a method for producing a set-type yogurt snack, said method comprising allowing said yogurt snack to acidify in a mold or block and wherein said yogurt snack comprises at least 12% (w/w) protein and at least 35% (w/w) total solids, wherein said yogurt snack comprises at least 13% (w/w) protein, preferably at least 14% (w/w) protein and more preferably at least 15% (w/w) protein, and wherein said method further comprises the removal of the resulting set-type yogurt snack from said mold or block. In a most preferred embodiment, the invention provides a method for producing a set-type yogurt snack, said method comprising allowing said yogurt snack to acidify in a mold or block and wherein said yogurt snack comprises at least 15% (w/w) protein and at least 35% (w/w) total solids, and wherein said method further comprises the removal of the resulting set-type yogurt snack from said mold or block.

The yogurt snack of the invention comprises at least 35% (w/w) total solids. Although 35% total solids results in an acceptable yogurt snack, the inventors of the present invention have noticed that even higher percentages of total solids result in a yogurt snack which has a lower stickiness, lower water activity and/or lower moisture migration. Hence, the invention thus preferably provides a method for producing a set-type yogurt snack, said method comprising allowing said yogurt snack to acidify in a mold or block and wherein said yogurt snack comprises at least 12% (w/w) protein and at least 35% (w/w) total solids, wherein said yogurt snack comprises at least 36% (w/w) total solids, preferably at least 37% (w/w) total solids, more preferably at least 38% (w/w) total solids and most preferably at least 39% (w/w) total solids, and wherein said method further comprises the removal of the resulting set-type yogurt snack from said mold or block. In a preferred embodiment, the invention provides a method for producing a set-type yogurt snack, said method comprising allowing said yogurt snack to acidity in a mold or block and wherein said yogurt snack comprises at least 12% (w/w) protein and at least 39% (w/w) total solids, and wherein said method further comprises the removal of the resulting set-type yogurt snack from said mold or block. Taking into account the most preferred protein percentage and the most preferred total solid percentage, the invention provides a method for producing a set-type yogurt snack, said method comprising allowing said yogurt snack to acidify in a mold or block and wherein said yogurt snack comprises at least 15% (w/w) protein and at least 39% (w/w) total solids, and wherein said method further comprises the removal of the resulting set-type yogurt snack from said mold or block.

The set-type yogurt snack of the present invention is different from regular set-type yogurts as sold in the supermarket due to its increased protein and total solids weight percentage. A further difference is that a set-type yogurt snack of the present invention is preferably prepared in a mold or block which is non-cup shaped. The set-type yogurt snack of the invention further differs from set-type yogurts as sold in the supermarket due to its ability to maintain its shape outside of the mold or block. A set-type yogurt snack of the invention also differs from set-type yogurts as sold in the supermarket since it can be hand-held outside of the mold or block used for setting. A set-type yogurt snack of the present invention is different from regular set-type yogurt as sold in the supermarket because it is removed from the casing in which it was allowed to acidify. A set-type yogurt snack as produced by a method of the invention is self-sustaining, hand-holdable and retains its shape when removed from the mold or block. The set-type yogurt snack does not drip between a person's fingers. I.e. a person can eat the set-type yogurt snack without dripping of yogurt between the fingers in the time needed to normally consume the snack.

The set-type yogurt bar is different from so-called quark bars amongst others due to a different type of culture. The set-style yogurt snack of the present invention preferably comprises thermophilic cultures whereas quark bars comprises mesophilic cultures. However, the yogurt bar of the present invention is also different from quark bars in different aspects (see above; for example the protein % and the solid content %) and hence mesophilic cultures can also be used.

Different combinations of steps can result in the production of a set-style yogurt snack. In a non-limiting aspect, the invention provides a method for producing a set-type yogurt snack, said method comprising allowing said yogurt snack to acidify in a mold or block and wherein said yogurt snack comprises at least 12% (w/w) protein and at least 35% (w/w) total solids and wherein said method further comprises the removal of the resulting set-type yogurt snack from said mold or block, said method comprising the steps of
  (a) dissolving milk powder (preferably skim milk powder) or milk powder concentrate in water or milk resulting in a first mixture
  (b) blending the obtained mixture of step (a) in concentrated milk or in milk with added protein and beat until smooth to obtain a second mixture and wherein said concentrated milk or said milk with added protein comprises a sufficient % protein to overall result in at least 12%, 13%, 14% or 15% (w/w) protein
  (c) heating said second mixture to at least 75° C. for at least 2 seconds and subsequently cool to 35 to 45° C.
  (d) inoculating the heat-treated mixture with a yogurt culture and pouring the obtained inoculated heat-treated mixture into a mold or block
  (e) putting the mold or block into a 35 to 45° C. incubator
  (f) fermenting in the mold or block until pH is in the range of 4.4 to 5.0
  (g) placing the mold or block into a cooler of 4 to 12° C. when the pH as described in step (f) is reached
  (h) removing the set yogurt from the mold or block.
Step (a)

In step (a) different kinds of starting material could be used such as whey protein concentrate (WPC), whey protein isolate (WPI), milk protein concentrate (MPC) or milk powder such as skim milk powder (SMP) or a mixture thereof. Preferably, a starting material is used which has good solubility and which does not result in grainy mouthfeel. A preferred starting material is SMP or MPC such as MPC40.

The SMP or the MPC is dissolved into water or milk to get a solution which is subsequently used in step (b).

The term "milk" is intended to encompass milks from mammals and plant sources or mixtures thereof. Preferably, the milk is from a mammal source. Mammals sources of milk include, but are not limited to cow, sheep, goat, buffalo, camel, llama, horse or reindeer. In an embodiment, the milk is from a mammal selected from the group consisting of cow, sheep, goat, buffalo, camel, llama, horse and deer, and combinations thereof. Plant sources of milk include, but are not limited to, milk extracted from soy bean, pea, peanut, barley, rice, oat, quinoa, almond, cashew, coconut, hazelnut, hemp, sesame seed and sunflower seed. Soy bean milk is preferred. In addition, the term "milk" refers to not only whole milk, but also skim milk or any liquid component derived thereof or reconstituted milk.

Preferably, the used starting material is skim milk powder and hence step (a) preferably comprises dissolving skim milk powder in water or milk resulting in a first mixture.

The use of skim milk powder or milk powder concentrate dissolved in water or milk as a starting point results in acceptable end products. Alternatively, the skim milk powder or the milk protein concentrate is dissolved in cream. Alternatively, sugar is added to the mixture of step (a).

The term "sugar" as used herein refers to any type of sugar. A suitable example is sucrose.

Step (b)

The mixture of step (a) is blended into concentrated milk. Alternatively, the mixture of step (a) is blended into milk with added protein. The concentrated milk or the milk with added protein comprises a % protein which (together with the % protein added in step (a)) results in a total/overall protein % (w/w) in the yogurts snack of at least 12%, 13%, 14% or 15% (w/w).

Examples of suitable concentrated milks are milk which is concentrated via ultrafiltration (UF milk), milk concentrated via reverse osmosis or milk obtained via evaporation. Preferably, the concentrated milk is ultrafiltered milk Ultrafiltered milk (UF milk), also known as diafiltered milk, is a subclassification of milk protein concentrate that is produced by passing milk under pressure through a thin, porous membrane to separate the components of milk according to their size. Specifically, ultra-filtration allows the smaller lactose, water, mineral, and vitamin molecules to pass through the membrane, while the larger protein and fat molecule are retained and concentrated. Depending on the intended use of the UF milk product, the fat in whole milk may be removed before filtration. The removal of water and lactose reduces the volume of milk, and thereby lowers its transportation and storage costs. The UF milk used in step (b) can be UF non-fat or UF skimmed milk. Milk protein concentrate may be added to the ultrafiltered milk to increase the protein percentage.

The blending of the obtained mixture of step (a) can be performed with any suitable (industrial) apparatus.

The beating until smooth to obtain a second mixture typically takes somewhere between a couple of seconds until a couple of hours. For example, if previously cooled and frozen UF milk is used it can take up to a couple of hours and if for example the UF milk is used immediately after heat treatment (as part of UF milk preparation) before fully cooled then the texture is smooth in seconds Preferably, the mixture of step (a) is blended with ultrafiltered milk, i.e. step (b) preferably comprises blending the obtained mixture of step (a) in ultrafiltered milk and beat until smooth to obtain a second mixture.

Preferably, the % (w/w) protein in the ultrafiltered milk comprising at least 12% (w/w) protein or in the milk with added protein comprising at least 12% (w/w) protein is for example 13, 14 or 15% (w/w) such that after addition of the ingredients of step (a) the aimed for protein percentage is obtained.

After blending, the mixture can be stored to improve rehydration, for example by storing for 4 hours at 4-7° C.

Step (c) Heating Said (Second Mixture) to at Least 75° C. for at Least 2 Seconds and Subsequently Cool to 35 to 45° C.

The heating in step (c) is to denature the (whey) proteins. It is clear for the skilled person that the used temperature and time in this step can be varied. In case the temperature is somewhat lower, the heating is performed for longer periods. In case the temperature is somewhat higher, a shorter heating step can be used. For example, if one wants to use an ultrahigh temperature (i.e. 135 degrees Celsius) the heat treatment can be performed for 2 seconds. To get sufficient protein denaturation it is preferred to use of temperature of at least 75° C. Preferably, a temperature of at least 80° C. is used.

The mixture is cooled to 35 to 45° C. after the heat treatment.

Step (d) Inoculating the Heat-Treated Mixture with a Yogurt Culture and Pouring the Obtained Inoculated Heat-Treated Mixture into a Mold or Block In step (d) the heat-treated mixture is inoculated with a culture. The culture produces the set-style yogurt in step (e). After adding of the culture to the heat-treated mixture, the obtained inoculated heat-treated mixture is poured into a mold or block. The mold or block is used as a casting mold which determines the shape of the final set-style yogurt, i.e. a container into which the inoculated heat-treated mixture is poured to create a given shape when the yogurt sets. As used herein, a mold is typically made of a flexible material (i.e. material which can be deformed) whereas a block is typically made of a non-flexible material (i.e. material that holds its shape under the used conditions). Preferably, a mold is used because this allows easier retrieval of the set-style yogurt. A preferred material for the mold is any food grade material that holds its shape or can be deformed and has a non-stick surface, such as, but not limited to, silicone (allowing easy removal of the set-style yogurt snack). Preferably, one mold or block can accommodate multiple separate set-type yogurt snacks which are separated from another in the mold or block (like a muffin baking tray in which multiple muffins can be prepared at the same time). For example, one mold or block can accommodate at least 10, preferably at least 12, more preferably at least 15, 20, 25 or 30 snacks. The set-type yogurt snack resulting from the used mold or block can be the final shape or can be a larger product which is subsequently cut into smaller products. As described above, the mold is preferably non-cup shaped. Preferably, the mold or block used in a method of the invention is not a starch tray prepared by filling a tray with starch and by forming a series of depressions or openings in the starch layer.

The majority (i.e. at least 90% of the acidification by the culture) takes place in a mold or block. It is therefore preferred that the pouring into the mold or block is performed immediately after inoculating of the heat-treated mixture with the culture.

The shape of the mold or block depends on the final product to be prepared. A suitable shape for a (collection of) mold(s) or block(s) is a bar, cylinder, rectangle, circle (hockey puck shape), sphere, square, sandwich, cake or the shape of an ice-cream.

In the context of the present invention, it is noted that the claimed method does not include a step
in which the snack is produced via extrusion. The shape of the set-type yogurt snack is determined by the shape of the used mold or block. It is possible to divide/cut the formed set-type yogurt snack in smaller parts/portions if necessary.

Step (e) Putting the Mold or Block into a 35 to 45° C. Incubator

The mold or block is subsequently placed into an incubator which allows fermentation of the cultures. A suitable incubator is one which has a temperature of 35 to 45° C.

Step (f) Fermenting in the Mold or Block Until pH is in the Range of 4.4 to 5.0

The mold or block is kept in the incubator which has a temperature of 35 to 45° C. until the pH has dropped and is in the range of 4.4 to 5.0. The incubation time depends on the used temperature. Lower temperatures typically result in increased incubation time before the culture has reached the desired pH. More preferably, the incubation is continued until the pH is in the range of 4.6 to 5.0 or 4.6 to 4.8. The incubation time also depends on the used culture or a blend of cultures (as discussed below). The inventors of the present invention have noticed (not exemplified herein) that the set-type yogurt snack is sufficiently firm at pH 4.8 and hence, in a preferred embodiment, fermentation (acidification) in the mold or block is performed until pH is 4.8. Preferably, the time to reach the desired pH is at most 6 to 8 hours. But if one is willing to wait for a longer period (for example overnight), the time to reach the desired pH can also be above 8 hours. In yet another preferred embodiment, the fermentation is continued until pH 4.6 has been reached. The inventors of the present invention have noticed that a fermentation temperature of 40 degrees Celsius and incubation overnight to pH 4.6 resulted in firmer set-type yogurt snacks which were preferred by some people who tested the snacks.

Step (g) Placing the Mold or Block into a Cooler of 4 to 12° C. when the pH as Described in Step (f) is Reached The mold or block is placed in a cooler when the desired drop in pH (i.e. end of fermentation) has been obtained. The cooler or refrigerator preferably has a temperature of 4 to 12° C., more preferably 4 to 10° C. or 4 to 8° C.

Step (h) Removing the Set Yogurt from the Mold or Block

The set-type yogurt is removed from the mold or block after the desired cooling temperature of step (g) is reached. Surprisingly, the protein and total solids result in a set-style yogurt product which retains its shape outside of the mold or block. Moreover, the product allows further handling without having a negative impact on the gel-like shape.

Optional Steps

The set-style yoghurt can subsequently be subjected to further steps, such as combining with biscuits or cereals. The set-type yogurt is not mixed with other ingredients such as biscuits or cereals, but biscuits are positioned at the outside of a set-type yogurt snack. Another optional step, is wrapping/packaging of the final set-style yogurt snack, preferably by using a suitable industrial machine. The present invention is not limited to any specific type of packing technology and any packing technique used.

The final sets-style yogurt snack is stored at a temperature of 4-6° C. but somewhat higher temperatures (for example up to 10° C.) can be used as well. The snack does not need to be frozen or lyophilised.

Different combinations of steps can result in the production of a set-style yogurt snack.

In yet another aspect, the invention provides a method for producing a set-type yogurt snack, said method comprising allowing said yogurt snack to acidify in a mold or block and wherein said yogurt snack comprises at least 12% (w/w) protein and at least 35% (w/w) total solids and wherein said method further comprises the removal of the resulting set-type yogurt snack from said mold or block, said method comprising the steps of
- (a) mixing cream, sugar and skim milk powder resulting in a first mixture
- (b) blending the obtained mixture of step (a) in ultrafiltered milk comprising at least 12% protein and beat until smooth to obtain a second mixture
- (c) heating said second mixture to at least 75° C. for at least 2 seconds and subsequently cool to 35 to 45° C.
- (d) inoculating the heat-treated mixture with a yogurt culture and pouring the obtained inoculated heat-treated mixture into a mold or block
- (e) putting the mold or block into a 35 to 45° C. incubator
- (f) fermenting in the mold or block until pH is in the range of 4.4 to 5.0
- (g) placing the mold or block into a cooler of 4 to 12° C. when the pH as described in step (f) is reached
- (h) removing the set yogurt from the mold or block.

The term "cream" is used herein to refer to a dairy product that is composed of the higher-butterfat layer skimmed from the top of milk before homogenization. This cream is a dispersion of fat droplets in a protein—containing water phase. In un-homogenized milk, the fat, which is less dense, will eventually rise to the top. In the industrial production of cream, this process is accelerated by using centrifuges called "separators". In many countries, cream is sold in several grades depending on the total butterfat content. Cream can be dried to a powder for shipment to distant markets. The cream as used in a method of the invention may also be a reconstituted cream. Fat levels in cream depend on the application and typically cream will at least contain 10% lipids (w/w on wet base). Cream used to make butter or butter oil usually contains at least 30% of lipids.

Instead of using cream in step (a), one can also use ultrafiltered milk with fat in it.

Most of the steps have been described above and the provided description of the steps is applicable to this aspect of the invention as well. The earlier described optional steps are also applicable to this part.

In yet another non-limiting aspect, the invention provides a method for producing a set-type yogurt snack, said method comprising allowing said yogurt snack to set in a mold or block and wherein said yogurt snack comprises at least 12% (w/w) protein and at least 35% (w/w) total solids, said method comprising the steps of
- (a) dissolving milk powder in milk to obtain a mixture comprising at least 12% (w/w) protein and at least 35% (w/w) total solids
- (b) heating said mixture to at least 75° C. for at least 2 seconds and subsequently cool to 35 to 45° C.
- (c) inoculating the heat-treated mixture with a yogurt culture and pouring the obtained inoculated heat-treated mixture into a mold or block
- (d) putting the mold or block into a 35 to 45° C. incubator
- (e) fermenting in the mold or block until pH is in the range of 4.4 to 5.0
- (f) placing the mold or block into a cooler of 4 to 12° C. when the pH as described in step (f) is reached
- (g) removing the set yogurt from the mold or block.

Most of the steps have been described above and the provided description is applicable to this aspect as well (however, steps (b) to (g) are explained under steps (c) to (h)). The earlier described optional steps are also applicable to this part.

Step (a) of the present aspect is somewhat different and comprises dissolving milk powder in milk (or water) to obtain a mixture which mixture comprises at least 12% (w/w) protein and at least 35% (w/w) total solids. The solubility of this mixture can be increased by using a selective peptidase.

The set-style yogurt snack prepared with a method as described above can be consumed as such and in that case an all dairy snack is provided. However, a method of the invention can comprise additional steps, which result in further processing of the set-style yogurt snack into a product which comprises additional—non dairy—components, i.e. into a modified set-type yogurt snack wherein the basis (the set-type yogurt snack) keeps its structure (i.e. the set-type yogurt snack is not mixed with other components). The invention thus provides a method as described above, further comprising covering the set-type yogurt with chocolate to obtain a modified set-type yogurt snack, or adding a cereal layer on the set-type yogurt to obtain a modified set-type yogurt snack, or sandwiching said set-type yogurt between biscuits to obtain a modified set-type yogurt snack or adding a cake bottom to the set-type yogurt to obtain a modified set-type yogurt snack.

As already described above, a method of the invention does not comprise a step of mixing the obtained set-style yoghurt with any of the mentioned ingredients, i.e. no mixing of the set-type yogurt snack with chocolate, cereal, biscuits or cake. Alternatively, a layer of a non-dairy product may be added on or between layers of set-type yogurt. This can further be combined with a layer of chocolate, cereal or with biscuits. For example, the claimed method includes a step of adding of fruit jam, fresh fruit, fruit puree or coffee extract on or between layers of the set-type yogurt.

In case the set-type yogurt snack is further processed, for example by adding at least one layer of chocolate, the snack is first dusted with a flour (for example coconut flour) such as to absorb surface moisture before coating with for example chocolate. Typically, dipping chocolate is very hydrophobic. With excess moisture absorbed the coating spreads over the snacks better without the free moisture on the surface of the snacks. Other powders such as starches are also suitable. I.e. an optional further step of any of the herein described methods is dusting the obtained set-type yogurt snack with a flour (such as but not limited to coconut flour).

In case, the set-type yogurt snack is at least partly covered with chocolate, it is preferred to add at least 2 layers of chocolate as this lengthen the time before the surface becomes wet and the coating flakes off.

Other processing steps can be easily conceived by the skilled person and are within the scope of the present invention.

A desired level of sweetness of the sets-style yogurt snack can be accomplished by including sugar as one of the starting materials. At least part of the added sugar can be reduced by using a lactase to convert the naturally present lactose into glucose and galactose. The invention therefore provides any of the above described methods further comprising adding a lactase before pouring the obtained inoculated heat-treated mixture into a mold or block. Preferably the lactase is added just before, after or during the inoculation of the heat-treated mixture with a yogurt culture. Lactases are commercially available. Suitable examples are Maxilact from DSM, Lactozyme from Novozymes etc. The use of a lactase together with reduction of added sugar results in a healthier set-style yogurt snack.

A certain level of sweetness can also be obtained by using a sweetener which is preferably added in step (a) or (b) of the method of the invention. Suitable examples are Stevia, Reb-A or Reb-M. A reduction in added sugar does not only result in a healthier snack but also allows the used culture to acidify sufficiently in the presence of high solids and high protein. The inventors of the present invention have noticed (not exemplified herein) that high levels of sugar severely increase the time to reach the desired pH. I.e. the use of a sweetener is preferred in a method of the invention such that the time to reach the desired pH (for example 4.6-4.8, more preferably 4.8) is at most 6 to 8 hours.

The steps of a method of the invention for producing a set-type yogurt snack can be performed without any interruptions but if a pause is desired, one can introduce a step of overnight cooling before heating the mixture to at least 75 degrees Celsius and subsequently cool to 35 to 45 degrees Celsius. Additional, the cooling step after the desired level of acidification has been reached can also be overnight. Alternatively, a yogurt culture or a blend of cultures can be chosen such that acidification can be performed overnight.

A skilled person is very well capable of selecting a culture or a blend of cultures which can be used in any of the herein described methods. As described herein, the fermentation is continued until the pH is in the range of 4.4 to 5.0. More preferably, the fermentation is continued until the pH is in the range of 4.6 to 5.0 or 4.6 to 4.8. Most preferably, the fermentation is stopped at pH 4.8. Many lactic acid bacteria (or blends) thereof will be able to reach the mentioned pH in a certain amount of time and hence it is just a matter of how long a skilled person is willing to wait until the desired drop in pH has occurred. I.e. the used culture or blend of cultures can be adapted to the need of the manufacturer.

Preferably, lactic acid bacteria or a blend thereof are/is selected which is capable of reaching pH 4.8 in at most 6-8 hours at 43 degrees Celsius in a dairy based substrate which substrate comprises at least 12% (w/w) protein and at least 35% (w/w) total solids. Preferably this goal is reached using an inoculation rate of ≤0.02%. Preferably, this goal is reached in the presence of a sweetener such that the amount of added sugar can be kept as low as possible. Moreover, replacing part of the sugar with a sweetener results in a reduced time to reach the desired pH compared to the case in which part of the sugar is not replaced.

Preferably a blend of *Lactobacillus bulgaricus* and *Streptococcus thermophilus* is used. More preferably, a blend of *Lactobacillus bulgaricus* and *Streptococcus thermophilus* is used wherein the strains are selected on their ability to (i) acidify in a high (at least 12% (w/w)) protein medium and high (at least 35% (w/w)) total solid medium, (ii) provide structure via EPS production and (iii) reach pH 4.8 in at most 6 to 8 hours, based on ≤0.02% inoculation. Preferably, the medium is a dairy based substrate which comprises sugar and sweetener.

The skilled person is able to select a suitable culture or a blend of cultures based on these criteria from the publicly/commercially available cultures.

An example of a suitable culture is a *Lactobacillus delbrueckii* ssp. *bulgaricus* which strain was deposited on Mar. 21, 2018 at the Centraalbureau voor Schimmelcultures (also known as Westerdijk Fungal Biodiversity Institute (CBS)), Uppsalalaan 8, 3508 AD Utrecht, The Netherlands under the provisions of the Budapest Treaty and which strain is referred to as CBS 144136. The applicant requests that a sample of the micro-organism deposited for the present application as described may only be made available to an expert, until the date on which the patent is granted.

CBS 144136 is able to acidify in a high protein and high solid content environment.

More preferably, CBS 144136 is part of a blend of lactic acid bacteria. The other bacteria in such a blend can be selected based on their contribution to texture. An example of such a blend is commercially available as DELVO TAM GREEK BAR 3 (DSM, Food Specialties).

Another example of a suitable culture is Y-65 which is described in the examples and commercially available. The fermentation time of YS-65 is typically a bit longer when compared to DELVO TAM GREEK BAR 3, i.e. it takes longer (for example 2 hours longer) to reach the desired pH of for example 4.8.

A method for producing a set-type yogurt snack according to the invention can be a method for producing a plain (i.e. non-flavoured) or flavoured set-style yogurt snack. I.e. an additional step of the claimed method is adding a flavour such as a natural flavour like vanilla, strawberry, blueberry, banana, honey, lemon or orange or a warm flavour like expresso, dulce de leche or chai latte. Basically, any flavour could be used in a method of the invention. The flavour can for example be added in any of steps (a) to (d) but preferably after the heat treatment of step (c).

A method for producing a set-type yogurt snack according to the invention can be a method for producing a non-coloured or a coloured set-style yogurt snack. Preferably the used colour is a natural (i.e. non-chemically produced) colour. The colour can for example be added in any of steps (a) to (d) but preferably after the heat treatment of step (c).

A method for producing a set-type yogurt snack according to the invention can further comprising a step of adding a probiotic, a vitamin, fruit, syrup or food fibers.

As already mentioned, the resulting set-type yogurt snack has a gel like structure. In the context of the present invention, the method of the invention does not include adding (naturally derived) hydrocolloids, gelling agents, thickening agents and stabilizers such as pectin, agar, carrageenan, gelatine, Arabic gum or starch.

Preferably, the invention provides a method for producing a set-type yogurt snack which snack comprises at least 12% (w/w) protein and at least 35% (w/w) total solids and which snack does not comprise a hydrocolloid, a gelling agent, a thickening agent or a stabilizer, said method comprising allowing said yogurt snack to acidify in a mold or block and wherein said method further comprises the removal of the resulting set-type yogurt snack from said mold or block.

I.e. the invention provides a method for producing a set-type yogurt snack which snack comprises at least 12% (w/w) protein and at least 35% (w/w) total solids and which snack does not comprise a texturizing agent (or a texturing agent). Examples of a texturizing agent are a gelling agent (selected from gelatine, agar, carrageenan or pectin) or a stabilizer (selected from starch, agar, guar, gelatine, locust bean gum, xanthan gum, acacia gum, carrageenan, pectin or tara gum) or a gelling agent (for example gelatine, agar, carrageenan, pectin gums) or a thickener (for example guar gum, xanthan gum, pectin, starch, agar, carrageenan, alginic acid).

The set-type yogurt snack obtained by any of the herein described methods is very stable with regard to yeast and mold spoilage, because they can be stored for months in the cooler with no sign of yeast or mold. The shelf life of a set-type yogurt snack as described herein can—if necessary—be improved by adding a protective culture such as Delvoguard (DSM Food Specialties)

In yet another aspect the invention provides a set-type yogurts snack obtained by any of the above described methods and comprising at least 12% (w/w) protein and at least 35% (w/w) total solids. More preferably, the claimed set-type yogurt snack comprises at least 13% or 14% protein and at least 35% (w/w) total solids. Even more preferably, the claimed set-type yogurt snack comprises at least 15% (w/w) protein and at least 35% (w/w) total solids. Also preferred is a set-type yogurts snack comprising at least 12% protein and at least 36, 37 or 38% (w/w) total solids. Even more preferred is a set-type yogurts snack comprising at least 12% (w/w) protein and at least 39% (w/w) total solids. Most preferred is a set-type yogurts snack comprising at least 15% (w/w) protein and at least 39% (w/w) total solids.

Preferably, the % fat and the % added sugar are as low as possible, for example at most 9% (w/w) fat and at most 12% (w/w) sugar.

Lactase can be used to further reduce the % added sugar, for example for set-type yogurts snacks comprising at most 4% added sugar (sucrose).

The set-type yogurt snack can be a 100% yogurt snack or it can also comprise non-yogurt components such as chocolate, cereals, biscuits or it can be combined with a cake bottom.

Chocolate can be added on one side of the yogurts snack, the yogurt snack can be sandwiched between layers of chocolate, or vica versa: a layer of chocolate can be sandwiched between 2 layers of yogurt, the yogurts snack can be completely covered with chocolate or the yoghurt snack is for example sliced in at least 2 parts and a layer of chocolate is put between said at least 2 yogurt layers. A layer of cereals or biscuits can be arranged in a similar way.

The yogurt snack can also be allowed to set in a pie cake form and subsequently be combined with a cake bottom.

Moreover, layers of fruit can be added to the yogurts snack such as fruit jam, fresh fruit, fruit puree, coffee extract.

To keep the snack as healthy as possible, it is preferred to have a final snack which comprises at least 75% of set-style yogurt and at most 25% other ingredients such as chocolate or biscuits.

The set-type yogurt snack can have any shape such as a bar, cylinder, rectangle, circle (hockey puck shape), sphere, square, sandwich, (cheese) cake piece/slide or the shape of an ice-cream.

The set-type yogurt snack is free from naturally derived hydrocolloids, gelling agents, thickening agents and stabilizers such as pectin, agar, carrageenan, gelatine, Arabic gum, starch. I.e. the set-type yogurt snack does not contain a texturizing agent (as described above).

In a preferred embodiment, a set-style yogurt obtained by a method of the invention is covered on at least one side with chocolate.

A set-type yogurt snack of the invention may further comprise a probiotic, a vitamin or food fibers.

A set-type yogurt snack of the invention is typically stored at a temperature of 7 degrees Celsius or lower, more preferably between 2 and 7 degrees Celsius and is thus not a frozen set-type yogurt snack. A yogurt snack of the invention is not freeze-dried and thus has a moisture content of at least 60% as determined by composition testing performed by Eurofins. CEM moisture test (commonly used for Greek yogurt).

In yet another aspect, the invention provides a *Lactobacillus delbrueckii* ssp. *bulgaricus* DS74929 deposited with the Centraalbureau voor Schimmelcultures (CBS) (also known as Westerdijk Fungal Biodiversity Institute) on 21 Mar. 2018 having accession number CBS 144136.

The invention disclosed herein may be embodied in other specific forms without departing from the spirit or general characteristics thereof, some of which forms have been indicated, the embodiments described herein are to be considered in all respects illustrative and not restrictive, by applying current or future knowledge. The scope of the invention is to be indicated by the appended claims, rather than by the foregoing description, and all changes which

EXAMPLE 1

TABLE 1 formulation used to produce set yogurt bars

| ingredient | g/100 g | g/5000 g | TS | TF | TP | CHO |
|---|---|---|---|---|---|---|
| cream | 32 | 1600 | 13.50 | 11.55 | 0.91 | 0.93 |
| UF milk | 58 | 2900 | 16.29 | 0.41 | 12.13 | 2.35 |
| SMP | 6 | 300 | 5.81 | 0.05 | 2.17 | 3.12 |
| sugar | 4 | 200 | 4.00 | 0.00 | 0.00 | 4.00 |
| Stevia | 0.04 | 2 | 0.04 | 0.00 | 0.00 | 0.00 |
|  | 100 | 5000 | 39.6 | 12.0 | 15.2 | 10.4 |

TS = total solids
TF = total fat
TP = total protein
CHO = total carbohydrates
Last 4 columns: all values in the bottom row of the composition table are in percent (w/w).
All other values in the last 4 columns are percent contribution to the total of the particular ingredient.

Production of a high protein (15% (w/w)) hand-held yogurt snack that is coated in chocolate was produced by:

(1) Mixing cream, sugar and skim milk powder (SMP) and Stevia on a low speed to reduce foaming. Blended in ultrafiltered milk with 12% protein and beat until smooth.

(2) Mixture was held in cooler (4-7° C.) overnight. Alternatively, this step is performed for 4 hours at 4-7° C.

(3) Heated mixture at 80-85° C. for 5 minutes and cooled to 43° C.

(4) Inoculate the mixture with EB-Greek Bar-03 at 2-4 U/1000 L (0.02% inoculation rate at 4 U/1000 L). Added 5 ml/1000 L of Maxilact LGi 5000 immediately prior to adding the culture.

(5) Mixture was poured into silicone bar moulds and put into 43° C. incubator and fermented to pH 4.8 When the yogurt reached pH 4.8 the molds were place into the cooler (4-6° C.)

(6) Once cooled, the bars were removed from the molds and covered in chocolate.

(7) The bars were wrapped

The final bar is a low sugar, high protein yoghurt bar that is a hand-held snack.

The used EB-Greek-Bar-03 is a blend of cultures and is commercially available as DELVO TAM GREEK BAR 3 (DSM, Food Specialties). This blend of cultures comprises a *Lactobacillus delbrueckii* ssp. *bulgaricus* DS74929 which was deposited on Mar. 21, 2018 under number CBS 144136 at the Centraalbureau voor schimmelcultures (also known as Westerdijk Fungal Biodiversity Institute (CBS)), Uppsalalaan 8, 3508 AD Utrecht, The Netherlands under the provisions of the Budapest Treaty.

The above provided process was also performed by including Delvo Guard at 1 U/1000 L added concurrently with the acidifying culture and Maxilact. Delvo Guard can be obtained from DSM Food Specialties and is a protective culture that prevents yeast and mold growth in the yogurt snack. It results in an extended shelf life without having an impact on taste or texture.

EXAMPLE 2

TABLE 2

Reduced sugar formula 2 to produce set yogurt bars

| ingredient | g/100 g | g/5000 g | TS | TF | TP | CHO |
|---|---|---|---|---|---|---|
| cream | 32 | 1600 | 13.5 | 11.55 | 0.91 | 0.93 |
| UF Milk | 58 | 2900 | 16.29 | 0.41 | 12.13 | 2.35 |
| SMP | 6 | 300 | 5.81 | 0.05 | 2.17 | 3.12 |
| sugar | 4 | 200 | 4 | 0 | 0 | 4 |
| Stevia | 0.04 | 2 | 0.04 | 0 | 0 | 0 |
|  | 100 | 5000 | 39.6 | 12.0 | 15.2 | 10.4 |

TS = total solids
TF = total fat
TP = total protein
CHO = total carbohydrates
Last 4 columns: all values in the bottom row of the composition table are in percent (w/w).
All other values in the last 4 columns are percent contribution to the total of the particular ingredient.

Production of a high protein (15% (w/w)) hand-held yogurt snack that is coated in chocolate was produced using the following process:

(1) Cream, sugar, skim milk powder (SMP) and Stevia were mixed on a low speed to reduce foaming.

(2) The mixture was held overnight at 4-7° C. Alternatively, this step is performed for 4 hours at 4-7° C.

(3) Ultrafiltered skim milk with 21% (w/w) protein was added to the above mixture and beat until smooth (final protein of 15% (w/w)).

(4) The mixture was heated at 80-85° C. for 5 minutes and cooled to 43° C. (Example 2B: 40° C.).

(5) The mixture was inoculated with EB-Greek Bar-03 or at 4 U/1000 L (0.02%).

(6) 1 ml/1 liter of Maxilact LGi 5000 was added immediately prior to adding the culture (7) The mixture was poured into silicone bar molds and put into a 43° C. incubator and fermented to pH 4.8. When the yogurt reached pH 4.8 the molds were placed into the cooler (4-7° C.).

(8) Once cooled, the bars were removed from the molds, dusted with coconut flour and covered in chocolate. The coconut flower absorbs surface moisture to make coating easier. The chocolate is very hydrophobic. We also found that double coating with chocolate delayed the collection of moisture on the outside of the coated bars.

Bars were also successfully made using the same process with the commercially available culture Y-65.

There was an alternative process (Example 2A) where the mixture, after Step 6, was poured into a larger mold (e.g., bread pan), fermented in bulk and then cut into bar shapes for coating.

Another alternate procedure (Example 2B) was used where the bars were fermented in the bar molds as above but to pH 4.6 at a lower temperature (40° C.). The fermentation time was longer (overnight) but the bars were a little firmer.

The final bar is a low sugar, high protein yoghurt bar that is a hand-held snack. EB-Greek-Bar-03 is a blend of cultures and is commercially available as DELVO TAM GREEK BAR 3, 2 U (DSM, Food Specialties). Y65 is also commercially available as ULTRA-GRO® Y-65, 2 U or 6 U (DSM, Food Specialties).

EXAMPLE 3

TABLE 3

Reduced sugar formula 2 to produce set yogurt bars

| Ingredient | g/100 g | g/5000 g | TS | TF | TP | CHO |
|---|---|---|---|---|---|---|
| Cream | 33 | 1650 | 13.92 | 11.91 | 0.94 | 0.96 |
| UF milk | 60 | 3000 | 15.97 | 0.35 | 11.74 | 2.42 |
| WPC80 | 3 | 150 | 2.91 | 0.02 | 2.40 | 0.30 |
| Sugar | 4 | 200 | 4.00 | 0.00 | 0.00 | 4.00 |
| Stevia | 0.04 | 2 | 0.04 | 0.00 | 0.00 | 0.00 |
| | 100 | 5000 | 36.80 | 12.27 | 15.08 | 7.69 |

TS = total solids
TF = total fat
TP = total protein
CHO = total carbohydrates
Last 4 columns: all values in the bottom row of the composition table are in percent (w/w). All other values in the last 4 columns are percent contribution to the total of the particular ingredient.

The process here is the same as Example 2 but with a slightly different formula. Whey protein concentrate with 80% protein (WPC80) was used instead of skim milk powder. There was less lactose for the Maxilact to act on so less glucose was liberated, resulting in less sweetness. The alternate source of protein resulted in a firmer and rubberier texture.

EXAMPLE 4

TABLE 4

Full sugar alternative formulation to produce set yogurt bars

| ingredient | g/100 g | g/5000 g | TS | TF | TP | CHO |
|---|---|---|---|---|---|---|
| cream | 32.5 | 1625 | 13.71 | 11.73 | 0.92 | 0.95 |
| UF Milk | 53 | 2650 | 14.10 | 0.31 | 10.37 | 2.14 |
| MPC85 | 2.5 | 125 | 2.43 | 0.01 | 2.13 | 0.20 |
| sugar | 12 | 600 | 12.00 | 0.00 | 0.00 | 12.00 |
| | 100 | 5000 | 42.24 | 12.05 | 13.42 | 15.29 |

TS = total solids
TF = total fat
TP = total protein
CHO = total carbohydrates
Last 4 columns: all values in the bottom row of the composition table are in percent (w/w). All other values in the last 4 columns are percent contribution to the total of the particular ingredient.

Fermentations are considerably longer with full sugar, especially to pH 4.6-8 to 10 hours to pH 4.8 and 18 to 21 hours to pH 4.6 with culture Y-65.

The overall process was the same as described in Example 2 except for the formula. The source of protein was milk protein concentrate with 85% protein (MPC85) and no Maxilact was added.

The invention claimed is:

1. A method for producing a fermented set-type yogurt snack comprising:
   (a) adding a milk-based inoculated mixture to a mold or block; and
   (b) fermenting and acidifying said milk-based inoculated mixture in said a mold or block until a desired pH is achieved to produce fermented product comprising at least 12% (w/w) protein and at least 35% (w/w) total solids; and
   (c) cooling said fermented product to a temperature of between 4° C. and 12° C., or
   (c') storing and cooling said fermented product to a temperature of between 2° C. and 7° C., to produce a fermented set-type yogurt snack.

2. The method according to claim 1, wherein said fermented set-type yogurt snack does not comprise a hydrocolloid, a gelling agent, a thickening agent or a stabilizer.

3. The method according to claim 1, wherein said method does not comprise mixing the milk-based inoculated mixture with other ingredients.

4. The method according to claim 1, wherein said fermented set-type yogurt snack is a hand-held fermented set-type yogurt snack.

5. The method according to claim 1, wherein said fermented set-type yogurt snack comprises at least 13% (w/w) protein.

6. The method according to claim 1, wherein said fermented set-type yogurt snack comprises at least 36% (w/w) total solids.

7. The method according to claim 1, said method further comprising:
   (a) dissolving milk powder, skim milk powder, or milk powder concentrate in water or milk resulting in a first mixture;
   (b) blending the first mixture of (a) in concentrated milk or in milk with added protein to obtain a second mixture and wherein said concentrated milk or said milk with added protein comprises a sufficient % protein to overall result in at least 12% (w/w) protein;
   (c) heating said second mixture to at least 75° C. for at least 2 seconds and subsequently cooling said second mixture to 35 to 45° C. to obtain a heat-treated and cooled mixture;
   (d) inoculating the heat-treated and cooled mixture with a yogurt culture to obtain the milk-based inoculated mixture and pouring the inoculated mixture into a mold or block;
   (e) putting the mold or block into a 35 to 45° C. incubator;
   (f) the fermenting in the mold or block until the desired pH of the milk-based inoculated mixture is in a range of 4.4 to 5.0; and
   (g) placing the mold or block into a cooler at a temperature of 4 to 12° C. when the desired pH as described in (f) is reached.

8. The method according to claim 7, wherein (a) comprises dissolving the skim milk powder in water or milk resulting in the first mixture.

9. The method according to claim 7, wherein (b) comprises blending the first mixture of (a) in ultrafiltered milk comprising at least 12% protein and beating until smooth to obtain the second mixture.

10. The method according to claim 1, said method comprising:
   (a) mixing cream, sugar and skim milk powder resulting in the first mixture;
   (b) blending the first mixture of (a) in ultrafiltered milk comprising at least 12% (w/w) protein to obtain the second mixture;
   (c) heating said second mixture to at least 75° C. for at least 2 seconds and subsequently cooling said second mixture to 35 to 45° C. to obtain a heat-treated and cooled mixture;
   (d) inoculating the heat-treated and cooled mixture with a yogurt culture to obtain the milk-based inoculated mixture and pouring the milk-based inoculated mixture into a mold or block;

(e) putting the mold or block into a 35 to 45° C. incubator;
(f) fermenting the milk-based inoculated mixture in the mold or block until the desired pH of the inoculated mixture is in a range of 4.4 to 5.0; and
(g) placing the mold or block into a cooler at a temperature of 4 to 12° C. when the pH as described in (f) is reached.

11. The method according to claim 1, said method comprising:
(a) dissolving milk powder in milk to obtain the first mixture comprising at least 12% (w/w) protein and at least 35% (w/w) total solids;
(b) heating said first mixture to at least 75° C. for at least 2 seconds and subsequently cooling said mixture to 35 to 45° C.;
(c) inoculating the heat-treated mixture with a yogurt culture to obtain the milk-based inoculated mixture and pouring the milk-based inoculated mixture into a mold or block;
(d) putting the mold or block into a 35 to 45° C. incubator;
(e) fermenting the milk-based inoculated mixture in the mold or block until the desired pH of the inoculated mixture is in a range of 4.4 to 5.0; and
(f) placing the mold or block into a cooler at a temperature of 4 to 12° C. when the pH as described in (e) is reached.

12. The method according to claim 1, wherein said mold is a silicone mold.

13. The method according to claim 1, further comprising (i) covering the fermented set-type yogurt snack with chocolate to obtain a modified fermented set-type yogurt snack, or (ii) adding a cereal layer on the fermented set-type yogurt snack to obtain a modified fermented set-type yogurt snack, or (iii) sandwiching the fermented set-type yogurt snack between one or more biscuits to obtain a modified fermented set-type yogurt snack or (iv) adding a cake bottom to the fermented set-type yogurt snack to obtain a modified fermented set-type yogurt snack.

14. The method according to claim 1, further comprising adding a lactase to said milk-based inoculated mixture before allowing said milk-based inoculated mixture to ferment and acidify in the mold or block.

15. The method according to claim 1, further comprising adding a sweetener to said milk-based inoculated mixture before allowing said milk-based inoculated mixture to ferment and acidify in the mold or block.

16. The method according to claim 7, wherein the pouring into the mold or block is performed immediately after the inoculating the yogurt culture.

17. The method according to claim 1, wherein the mold or block has a shape of a bar, cylinder, rectangle, circle, sphere, square, sandwich, or cake.

18. The method according to claim 1, further comprising adding a flavor to said milk-based inoculated mixture before allowing said milk-based inoculated mixture to ferment and acidify in the mold or block.

19. The method of claim 17, further comprising removing the fermented set-type yogurt snack from the mold or block and wherein the fermented set-type yogurt snack retains shape of a bar, cylinder, rectangle, circle, sphere, square, sandwich, or cake after being removed from the mold or block.

* * * * *